United States Patent
Guralnik et al.

(10) Patent No.: US 7,552,030 B2
(45) Date of Patent: Jun. 23, 2009

(54) SYSTEM AND METHOD FOR LEARNING PATTERNS OF BEHAVIOR AND OPERATING A MONITORING AND RESPONSE SYSTEM BASED THEREON

(75) Inventors: Valerie Guralnik, Orono, MN (US); Karen Z. Haigh, Greenfield, MN (US); Steven A. Harp, Coon Rapids, MN (US)

(73) Assignee: Honeywell International Inc., Morristown, NJ (US)

( * ) Notice: Subject to any disclaimer, the term of this patent is extended or adjusted under 35 U.S.C. 154(b) by 186 days.

(21) Appl. No.: 10/339,941

(22) Filed: Jan. 10, 2003

(65) Prior Publication Data
US 2003/0229471 A1    Dec. 11, 2003

Related U.S. Application Data

(60) Provisional application No. 60/424,257, filed on Nov. 6, 2002, provisional application No. 60/384,899, filed on May 30, 2002, provisional application No. 60/384,519, filed on May 29, 2002, provisional application No. 60/368,307, filed on Mar. 28, 2002, provisional application No. 60/351,300, filed on Jan. 22, 2002.

(51) Int. Cl.
*G06F 15/00* (2006.01)
*G06F 17/18* (2006.01)

(52) U.S. Cl. .............. 702/188; 702/181; 702/182; 702/189; 700/9; 714/39

(58) Field of Classification Search ......... 702/179–190, 702/19; 700/9, 10; 714/39; 703/2
See application file for complete search history.

(56) References Cited

U.S. PATENT DOCUMENTS 4,259,548 A    3/1981   Fahey et al. ............... 379/38

(Continued)

FOREIGN PATENT DOCUMENTS

EP    0 558 975 A1    2/1993

(Continued)

OTHER PUBLICATIONS

PCT Search Report mailed Nov. 10, 2003 (6 pgs.).

(Continued)

*Primary Examiner*—Eliseo Ramos Feliciano
*Assistant Examiner*—Phuong Huynh
(74) *Attorney, Agent, or Firm*—Kris T. Fredrick; Kermit D. Lopez; Luis M. Ortiz (57) ABSTRACT

A system and method of operating a monitoring and response system for an actor in a daily living environment that relies upon learned models of behavior for adapting system operation. The learned model of behavior preferably includes sequential patterns organized pursuant to assigned partition values that in turn are generated based upon an evaluation of accumulated data. Based upon reference to the learned model of behavior, the system can generate more appropriate response plans based upon expected or unexpected activities, more readily recognize intended activities, recognize abandoned tasks, formulate probabilities of method choice, build probabilities of action success, anticipate and respond to actor movement within the environment, optimize response plan effectiveness, and share learned models across two or more separate system installations.

56 Claims, 3 Drawing Sheets

U.S. PATENT DOCUMENTS

| | | | |
|---|---|---|---|
| 4,803,625 A | 2/1989 | Fu et al. ..................... 600/483 |
| 4,843,377 A * | 6/1989 | Fuller et al. .............. 340/573.4 |
| 4,952,928 A | 8/1990 | Carroll et al. ........... 340/10.41 |
| 5,086,385 A | 2/1992 | Launey et al. ................. 700/83 |
| 5,228,449 A | 7/1993 | Christ et al. ................ 600/504 |
| 5,400,246 A | 3/1995 | Wilson et al. ................. 700/17 |
| 5,410,471 A | 4/1995 | Alyfuku et al. ............. 600/300 |
| 5,441,047 A | 8/1995 | David et al. ................. 600/483 |
| 6,130,620 A * | 10/2000 | Pinnow et al. ............. 340/5.86 |
| 6,212,510 B1 * | 4/2001 | Brand ......................... 706/62 |
| 6,437,696 B1 * | 8/2002 | Lemelson et al. ........ 340/573.4 |
| 6,549,915 B2 * | 4/2003 | Abbott et al. ............ 707/104.1 |
| 6,581,037 B1 * | 6/2003 | Pak ............................... 705/1 |
| 6,582,380 B2 * | 6/2003 | Kazlausky et al. .......... 600/595 |
| 6,611,206 B2 * | 8/2003 | Eshelman et al. ........ 340/573.1 |
| 6,678,413 B1 * | 1/2004 | Liang et al. ................. 382/181 |
| 6,796,799 B1 * | 9/2004 | Yoshiike et al. ............. 434/236 |
| 6,952,662 B2 * | 10/2005 | Wegerich et al. ............... 703/2 |
| 2002/0084902 A1 * | 7/2002 | Zadrozny et al. ......... 340/573.1 |
| 2003/0004652 A1 * | 1/2003 | Brunner et al. ............... 702/19 |
| 2003/0058339 A1 * | 3/2003 | Trajkovic et al. ............. 348/155 |
| 2003/0059081 A1 * | 3/2003 | Trajkovic .................... 382/100 |
| 2004/0018477 A1 * | 1/2004 | Olsen ..................... 434/307 R |

FOREIGN PATENT DOCUMENTS

WO    WO 01/75653 A3    10/2001

OTHER PUBLICATIONS

Ramakrishnan Srikant et al. article entitled "Mining Sequential Patterns: Generalizations and Performance Improvements", pp. 3-17. (1996).

Michael C. Mozer article entitled "The Neural Network House: An Environment that Adapts to its Inhabitants", pp. 110-114. (1998).

G. Michael Youngblood article entitled "Communication and Simulation Infrastructure for MavHome", pp. 1-28. (Feb. 2002).

Diane J. Cook slides entitled "The Role of Prediction in Intelligent Environments", 27 pgs. (2002).

Valerie Guralnik et al. workshop publication entitled "Learning Models of Human Behaviour with Sequential Patterns", pp. 24-30. (2002).

* cited by examiner

SYSTEM AND METHOD FOR LEARNING PATTERNS OF BEHAVIOR AND OPERATING A MONITORING AND RESPONSE SYSTEM BASED THEREON

CROSS-REFERENCE TO RELATED APPLICATIONS

This application is related to, and is entitled to the benefit of, U.S. Provisional Patent Application Ser. No. 60/351,300, filed Jan. 22, 2002; U.S. Provisional Patent Application Ser. No. 60/368,307, filed Mar. 28, 2002; U.S. Provisional Patent Application Ser. No. 60/384,899, filed May 30, 2002; U.S. Provisional Patent Application Ser. No. 60/384,519, filed May 29, 2002; U.S. Non-provisional patent application Ser. No. 10/286,398, filed on Nov. 1, 2002; U.S. Provisional Patent Application Ser. No. 60/424,257, filed on Nov. 6, 2002; a non-provisional patent application filed on even date herewith, entitled "System and Method for Automated Monitoring, Recognizing, Supporting, and Responding to The Behavior of an Actor", having Ser. No. 10/341,335; and a provisional patent application filed on even date herewith, entitled "System and Method for Automatically Generating an Alert Message with Supplemental Information", having Ser. No. 60/439,346; the teachings of all of which are incorporated herein by reference.

BACKGROUND OF THE INVENTION

The present invention relates to an automated system and method for generating learned models of behavior of an actor and/or the actor's environment. More particularly, it relates to a system and method that generates learned models of behavior relating to particular actor/environment events and activities for use in adapting operations of an automated human actor environment monitoring system that may include response capabilities.

The evolution of technology has given rise to numerous, discrete devices adapted to make actor environment more convenient. For example, in the realm of in-home environments, companies are selling microwaves that connect to the internet, and refrigerators with computer displays, to name but a few. These and other advancements have prompted research into the feasibility of a universal home control system that not only automates operation of various devices or appliances within the home, but also monitors activities of an actor in the home. It could then perform device control based upon the actor's activities and/or events in the living space. In other words, it may now be possible to provide coordinated, situation-aware, universal support to an actor in a daily living environment.

The potential features associated with the "intelligent" home described above are virtually limitless. By the same token, the extensive technology and logic obstacles inherent to many desired features have heretofore prevented their implementation. In general terms, the automated monitoring and response system will consist of a suite of sensors in the living space to detect actor and environment states, a set of actuators that control devices in the environment as well as facilitate communication with the actor (and others), and a computer system (local or remote) capable of making decisions to assist the actor. With these parameters in mind, current response and monitoring systems rely on a pre-programmed computer system that executes predetermined operations based upon a predetermined number and located sensors and actuators within the actor's home, each sensor and actuator having known capabilities. These systems are highly inflexible. From a market viability standpoint, such a configuration is simply impractical. That is to say, virtually every installation of the monitoring and response system will entail a different environment layout, and varying numbers and capabilities of sensors and actuators. An inflexible control system is simply unable to adapt to varying sensor and actuator configurations, and thus is of reduced value. Along these same lines, currently-envisioned automated monitoring and response systems rely upon a highly labor intensive initial configuration, whereby the actor and/or others are required to personally "set-up" the operational parameters (e.g., designate types, locations, and capabilities of sensors and actuators; designate typical or expected daily activities of the actor; designate daily needs of the actor; etc.). Similarly, the capabilities, needs and responses provided by the system will almost certainly need to change over time due to changes in the actor and/or the actor's environment. Currently, inflexible systems require that the actor and/or others not only independently recognize that a change in the actor's needs or activities has occurred, but also that the system be manually re-programmed to appropriately address the change(s). For a "technophobic" actor, the initial configuration is overwhelming at best, as would be any subsequent system reconfiguration to address inevitable changes in the actor or in the actor's environment.

Emerging sensing and automation technology represents an exciting opportunity to develop an independent in-home assistant system. In this regard, a highly desirable attribute associated with such a system is an ability to be rapidly deployable, easy to configure, and automatically adapt as the actor, the actor's environment, and technology changes. Unfortunately, current techniques for configuring an appropriate system are highly inflexible, and difficult to configure. Thus, a need exists for a system and method for learning properties (e.g., patterns, profiles, preferences, etc.) of an actor or their environment (including other humans/animals in the environment) as part of the operation of an automated actor environment monitoring and response system.

DETAILED DESCRIPTION OF THE PREFERRED EMBODIMENTS

Figure 1:
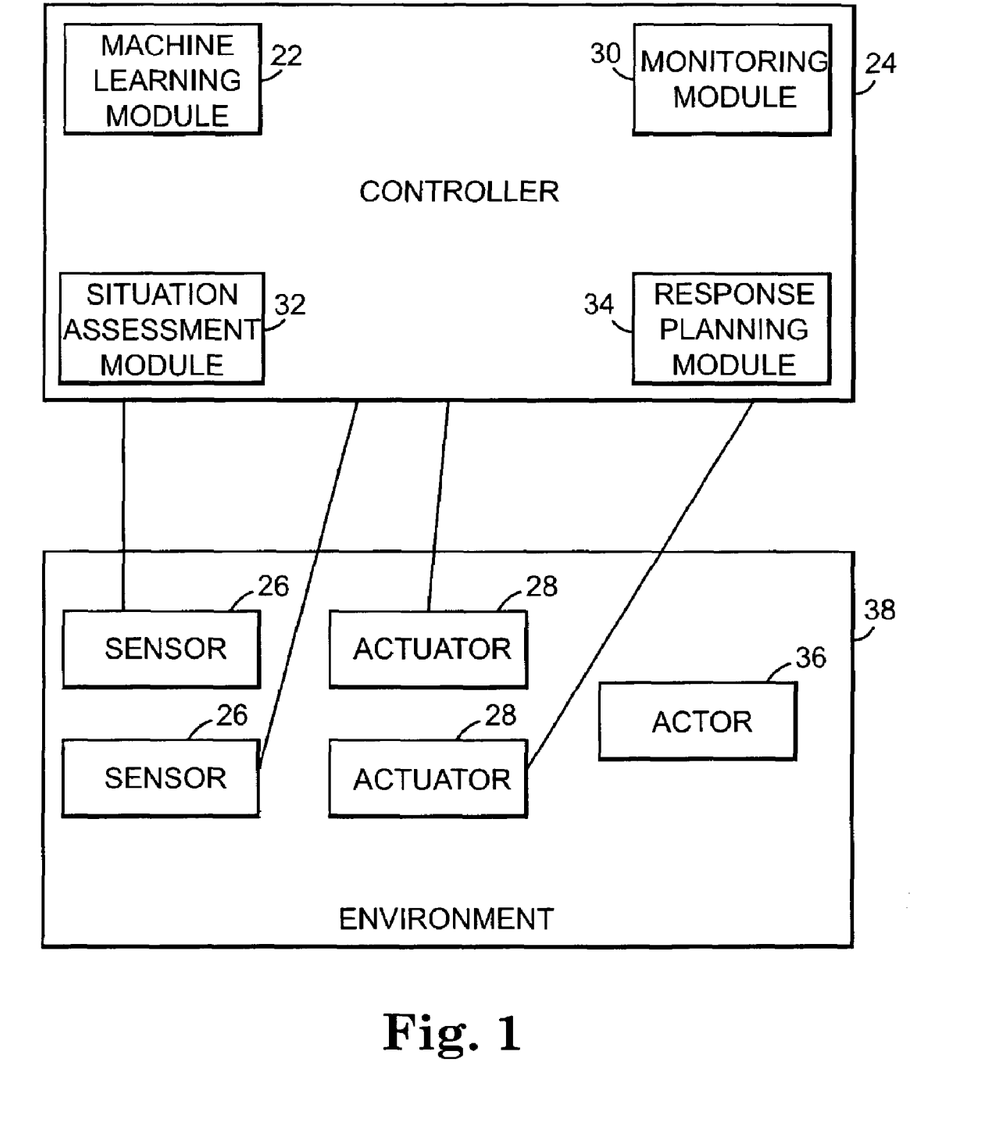
FIG. 1 is a block diagram illustrating a monitoring and response system incorporating a machine learning module in accordance with the present invention.

The present invention relates to a system and method of generating a learned model of behavior of an actor or the actor's environment as part of the operation of an automated monitoring and response system. In this regard, FIG. 1 provides an exemplary illustration, in block form, of a monitoring and response system 20 including a machine learning module 22 in accordance with the present invention. The system 20 can assume a variety of forms, but preferably includes a controller 24, a plurality of sensors 26, and one or more actuators or effectors 28. As described in greater detail below, the machine learning module 22 is preferably provided as part of the controller 24 that further includes other components such as a monitoring module 30, a situation assessment module 32, and a response planning module 34.

In general terms, the sensors 26 actively, passively, or interactively monitor activities of an actor or user 36, as well as segments of the actor's environment 38. As used throughout this specification, the term "environment" encompasses a physical structure in which the actor 36 is present (permanently or periodically) as well as all things in that physical structure, such as lights, plumbing, appliances, humans other than the actor 36 that at least periodically visit, animals (e.g., pets), etc. Information or data from the sensors 26 is signaled to the controller 24 for interpretation by the monitoring module 30. The situation assessment module 32 processes information from the monitoring module 30 to determine what the actor 36 is doing (and/or intending to do) along with what is happening in the actor's environment 38. The response planning module 34, in turn, generates appropriate responses that are carried out via the actuator(s) 28. In this regard, the preferred machine learning module 22 "optimizes" operation of the situation assessment module 32 and the response planning module 34, as well as other modules relating to operation of the system 20, based upon automatically generated learned models of behavior formulated from information provided by the sensors 26.

The key component associated with the system 20 of the present invention resides in the machine learning module 22 as described below. As such, the sensors 26, the actuators 28, as well as other modules (e.g., the situation assessment module 32 and the response planning module 34) can assume a wide variety of forms. Preferably, the sensors 26 are networked by the controller 24. The sensors 26 can be non-intrusive or intrusive, active or passive, wired or wireless, physiological or physical. In short, the sensors 26 can include any type of sensor that provides information relating to the activities of the actor 36 or other information relating to the actor's environment 38. For example, the sensors 26 can include motion detectors, pressure pads, door latch sensors, panic buttons, toilet-flush sensors, microphones, cameras, fall-sensors, door sensors, heart rate monitor sensors, blood pressure monitor sensors, glucose monitor sensors, moisture sensors, light level sensors, smoke/fire detectors, thermal sensors, water sensors, seismic sensors, etc. In addition, one or more of the sensors 26 can be a sensor or actuator associated with a device or appliance used by the actor 36, such as a stove, oven, television, telephone, security pad, medication dispenser, thermostat, etc., with the sensor or actuator 26 providing data indicating that the device or appliance is being operated by the actor 36 (or someone else).

Similarly, the actuators or effectors 28 can also assume a wide variety of forms. In general terms, the actuators or effectors 28 are configured to control operation of a device in the actor's environment 38 and/or to interact with the actor 36. Examples of applicable actuators or effectors 28 include computers, displays, telephones, pagers, speaker systems, lighting systems, fire sprinkler, door lock devices, pan/tilt/zoom controls on a camera, etc. The actuators or effectors 28 can be placed directly within the actor's environment 38, and/or can be remote from the actor 36, providing information to other persons concerned with the actor's 36 daily activities (e.g., caregiver, family member(s), etc.). For example, the actuator 28 can be a speaker system positioned in the actor's 36 kitchen that audibly provides information to the actor 36. Alternatively, and/or in addition, the actuator 28 can be a computer located at the office of a caregiver for the actor 36 that reports desired information (e.g., a need to refill a particular medication prescription).

The controller 24 is preferably a microprocessor-based device capable of storing and operating the various modules illustrated in FIG. 1, including the machine learning module 22. With respect to the other modules 30-34 illustrated in FIG. 1, each can be provided as individual agents or software modules designed around fulfilling the designated function. Alternatively, one or more of the modules 30-34 can instead be a grouping or inter-working of several individual modules or components that, when operated by the controller 24, serve to accomplish the designated function. Even further, separate modules can be provided for individual subject matters that internally include the ability to perform one or more of the functions associated with the monitoring module 30, the situation assessment module 32, the response planning module 34, as well as other functions desired for the monitoring and response system 20. Regardless of exact configuration, however, the modules 30-34 serve to monitor information provided by the sensors 26, assess the current situation of the actor 36 and/or the actor's environment 38, generate appropriate interactive plans responsive to the determined situation, and effectuate those plans (relative to the actor 36 and/or anything in the environment 38) via the actuators 28. Additional features may include an ability to determine intended actions of the actor 36, evaluate system operations based upon unobserved actions of the actor 36, stored data logs, etc. Regardless, the system 20 preferably makes use of information generated by the machine learning module 22 in the operation of one or more, preferably all, of the various other modules.

With the above in mind, the machine learning module 22 preferably provides a means for on-going adaptation and improvement of system 20 responsiveness relative to the needs of the actor 36. The machine learning module 22 preferably entails a learned behavior model built over time for the actor 36 and/or the actor's environment 38 (including persons other than the actor 36). In general terms, the learned model is built by accumulating passive (or sensor-supplied) data and/or active (actor and/or caregiver generated) data in an appropriate database. The resulting learned models are then available to the controller 24 (or modules therein) for enabling the system 20 to automatically configure itself and to adapt to changing conditions, minimizing the time and labor involved in set-up and maintenance. Further, the learned models of behavior can be employed to assist in selecting a most appropriate response plan, including the quality and presentation of the interaction. Even further, the learned models of behavior can be utilized by other monitoring and response systems for improved default installation parameters and designations. In short, the learned models of behavior can be used to improve general system performance.

The machine learning module 22 is preferably configured to generate learned models of behavior for a number of different events, activities, or functions (of the actor 36, the environment 38, or the system 20). The goal of the machine learning module 22 is to model the actor's 36 and/or the actor's environment 38 behavior with enough accuracy to recognize situations and respond to situations. The data used by the machine learning module 22 in generating these learned models of behavior is provided by the sensors 26 (unsupervised learning) and/or feedback from the actor 26 or others (supervised learning). To this end, and as used throughout the specification, reference is made to "firing" of a sensor. This is intended to mean that a particular passive sensor has been "activated" or otherwise sensed an action (e.g., a motion sensor "fires" when something moves through, for example, a light beam; a glass break sensor "fires" when the glass to which the sensor is associated with breaks, etc.), or that an active "sensor" has received information indicative of a particular action or activity. With this in mind, examples of learned models of the actor include patterns of the actor 36 over a week (such as waking/sleeping times, toilet use), activity schedules (bathing, cooking, recreation, etc.), paths normally followed by the actor 36 when moving from room to room, preferences for and efficacy of interaction models, etc. Learned models of the environment 38 include, for example, patterns such as expected background noise, patterns of visitors to the home, appliance power use signatures, efficacy of interaction models with other actors, etc. Learned models relating to performance of the system 20 include, for example, sensor reliability and actuator response time (e.g., how long it takes to clear smoke from a particular room). Similarly, the effectiveness of learned models can be learned, as well as a breadth of system coverage (e.g., how much learning is needed a priori or based on learned models from other system installations). Further, the learned models can indicate system sensitivity to changes (e.g., how quickly the system 20 must adapt to changes in an elderly actor) and robustness in the presence of a typical events.

A variety of techniques can be employed by the machine learning module 22 to build the learned models of behavior (e.g., actor's behavior, environment's 38 behavior, or any other "tracked" persons or things in the environment 38). In general terms, the learned models of behavior can be built using calibrated, simple parametric models; trending, averages, and other statistical measures; sequences of or correlations between sensor/actuator firings/usage; sequences or structure of inferred activity models; timings associated with the above and/or probability transitions associated with the above.

Regardless of how the machine learning module 22 generates learned models of behavior, the so-generated information can be utilized in a number of fashions. For example, (1) the system 20 can incorporate several machine learning modules, with each module being adapted to generate data for one or more other modules or agents (i.e., the situation assessment module 32, the response planning module 34, etc.) that is otherwise adapted to utilize the generated information. For example, an alarm module can be provided as part of the system 20 that is adapted to raise an alarm for unexpected activities (e.g., the back door being opened at 3:00 a.m.). In a preferred embodiment, this alarm module functions by understanding when an activity is "normal" based upon the learned models of behavior generated by the machine-learning module 22. Similarly, (2) the learned models of behavior information can be utilized to raise an alarm for expected activity that does not otherwise happen (e.g., the actor 36 normally gets out of bed by 8:00 a.m. as determined by the machine learning module 22, on a particular day when the actor 36 does not get out of bed by that time, an alarm would be raised). Further, (3) the machine learning module 22 can be utilized in generating probabilities for the likelihood that an activity "will be engaged in", with the information being used by an intent recognition module or agent that would bias its recognition of an activity accordingly (e.g., if the machine learning module 22 determines or indicates that it is extremely likely that a cooking activity happens at 5:00 p.m., then the intent recognition module is more likely to recognize a cooking activity at that time even if the sensors are providing information that does not fully substantiate such a conclusion).

Also, (4) the machine learning module 22 can be utilized in building probabilities that tasks will be abandoned (e.g., the actor 36 is two-thirds finished making breakfast, the phone rings, and the actor 36 then forgets to finish breakfast; the machine learning module 22 builds a model of the normal "breakfast making" steps from which a determination can be made that because one or more remaining, identified steps have not been completed, the breakfast making activity has been abandoned). Additionally, (5) the machine learning module 22 can build probabilities for method choice (e.g., the actor 36 can make breakfast either by using the microwave or the stove or the toaster; what are the probabilities of each of these occurring). Further, (6) the machine learning module 22 can build probabilities of action success (e.g., that the actor 36 will reach a desired person by telephone at a certain time of the day).

Another application is in (7) determining and applying learned models of paths the actor 36 normally follows at certain times in the day, and then be useful for anticipating the actor's 36 path and effectuate turning on relevant lights, opening doors, etc. Similarly, (8) the learned models can determine normal timings between certain, regular activities. For example, the learned models can postulate that the actor 36 normally eats lunch three hours after breakfast. This timing information can then be utilized in anticipating further events (e.g., in furtherance of the previous example, if it is determined that the actor 36 ate breakfast at a time of day later than normal, the timing information can be used to anticipate that lunch will also be consumed at a time later than normal).

Yet another possible application of the learned models of behavior is (9) understanding the effectiveness of a particular plan generated by the response planning module 34. For example, the machine learning module 22 can be utilized to determine the most effective recipient (e.g., the actor 36 or other human) of a particular message; the most effective device on which to deliver a message; the most effective modality for a message; the most effective volume, repetition, and/or duration within a modality; and the actor's 36 preferences regarding modality, intensity, etc. In this regard, the mechanism for learning might be very simple at first, but could become increasingly sophisticated by using contextual conditions for lessons (e.g., "the audio messages are ineffective when the actor is not in the same room as the speaker").

Yet another possible application of the learned models of behavior is (10) developing/sharing of learned models across two or more separate system installations. It is recognized that a particular learned model will likely be specific to a particular actor/environment. However, a learned model of behavior developed for a first system 20 could be used to improve the default behavior of a second system installation for a different actor. For example, the "normal" behavior of a "normal" actor/environment can be modeled, and then used as a baseline to learn the behavior of a second actor/environment. The learning process associated with the second actor/environment will then be much faster. In short, shared learning across two or more systems enables global lessons to be learned (server side learning). Even further, (11) a meta-model of behavior can be created by merging at least two learned models from the same or different system installations, with the meta-model being used as part of the operations of one or more of the systems (or an entirely separate system) as a baseline or to assess system coverage (e.g., whether all sensors are being understood; how much of understanding any one system 20 has of its corresponding actor's behavior; etc.).

Many of the examples of learning given above can proceed without any intervention from an authority or oracle, a style of learning known as "unsupervised learning". The path model provided above is an example whereby paths can be learned passively by the system 20 via observation of room occupancy over time. Other sorts of learning that require feedback from the actor 36, the actor's caregiver, and/or other system modules ("supervised learning") are also optionally employed in accordance with the present invention. Feedback may take the form of explicit preferences (e.g., the actor 36 rank orders some available options). Alternatively, the feedback information can be derived from specific statements provided by the actor 36 (e.g., "I prefer a phone to a pager," or "Don't remind me to use the bathroom when I have guests".). The feedback may also involve a teacher labeling training cases for the student module/agent. An example of this is a teacher telling a learning acoustic monitoring module/agent that "the sounds you heard between 8:40 and 8:55 was the actor preparing breakfast in the kitchen". Alternatively, feedback from a person other than the actor 36 can be response(s) to questions posed by the system 20. Finally, feedback may be non-specific reinforcement indicating relative success or failure to meet a system goal. Reinforcement learning could be particularly applied to the problem of learning the effectiveness of plans or actions. Learned actor preferences can be weighed against measured effectiveness. Using a plan known to be more effective may in some cases trump the desire to conform to the actor's preferences.

Because adaptive systems changes themselves after installation, the present invention preferably includes mechanisms to ensure safety and reliability of the installed system 20. Learned knowledge is checked against built-in knowledge to prevent the system 20 from acquiring dangerous or "superstitious" behaviors. The adaptive components of the system 20 allow the configure, and optionally the actor 36, to disable learning, check point their lessons (freeze), or re-set their learned state to a previous check point, including factory defaults.

One preferred learned model behavior building technique in accordance with the present invention is sequential pattern learning adapted to learn what sensor firings (or other stored information, such as the feedback information described above) correspond to what activities, in what order, and at what time. The technique of sequential pattern mining provides a basis for recognizing these activities and their order. A "sequential pattern" is defined as a list of sensor firings ordered in time. Sequential pattern mining addresses the problem of finding frequent sequential patterns. In a preferred embodiment, the sequential pattern learning associated with the machine learning module 22 extends currently available sequential pattern techniques to incorporate reasoning about the time of the activities.

To better understand the preferred sequential pattern learning technique associated with the machine learning module 22 of the present invention, the foregoing discussion incorporates hypothetical installation details for the system 20, and in particular, types of sensors 26 and environment 38 attributes. These hypotheticals are in no way limiting as the system and method of the present invention can be applied in a wide variety of settings.

One particular hypothetical system 20 installation includes a motion sensor positioned in a bathroom, a motion sensor positioned in a bedroom, a motion sensor positioned in the kitchen, and a motion sensor positioned in a living room. Under this scenario, examples of discovered sequential patterns over a certain number of days include: (1) 75% of the time, the bathroom motion sensor fires after the bedroom motion sensor fires, and (2) a pattern of the kitchen motion sensor firing followed by the living room sensor firing followed by the bedroom motion sensor firing occurs in 60% of the monitored days. From an implementation standpoint, it is not enough to simply apply the sequential pattern algorithm to sensor data and hope to discover sequential patterns that will meaningfully model the actor's 36 behavior and/or behavior of the actor's environment 38. This is because an accurate explanation of what each discovered pattern represents cannot be provided. For example, relative to the above hypothetical data, firing of the bedroom motion sensor may represent several types of activities, such as the actor 36 waking up in the morning, the actor 36 entering the bedroom in the evening to go to sleep, etc. One preferred technique of attaching a meaning to a pattern is to determine the time periods during which each of the monitored sensors are firing. For example, and again relative to the above hypothetical, the examples of discovered sequential patterns can now be designated as: (1) after a bedroom motion sensor firing between 6:45 a.m. and 7:45 a.m., the bathroom motion sensor fires between 7:00 a.m. and 8:00 a.m. 75% of the observed time; and (2) in 60% of the observed days, the pattern kitchen motion sensor fires between 6:00 p.m. and 6:30 p.m. followed by the living room motion sensor firing between 6:20 p.m. and 7:00 p.m. followed by the bedroom motion sensor firing between 9:00 p.m. and 10:00 p.m.

In light of the above, identification of appropriate time periods for each sensor makes it easier to attach a meaning to the pattern learned through unsupervised learning. In the above examples, the first pattern might represent the actor's 36 waking-up routine, while the second pattern might represent the actor's 36 after work/evening routine.

In order to properly identify intervals of occurrence of each event in a sequential pattern as highlighted by the above examples, the machine learning module 22 preferably identifies appropriate time periods or intervals for each sensor firing. In this regard, one approach is to generate the intervals during the sequential patterns' discovery phase. However, the overhead is intractable, since all possible intervals must be considered. Alternatively, and in accordance with one preferred embodiment of the present invention, the time intervals are predetermined and enumerated before sequential pattern learning occurs. It is recognized that this approach has the potential drawback that the quality of the discovered patterns can be affected by the way the system 20 and/or the module 22 defines the intervals. However, to minimize this possibility, the preferred machine learning module 22 does not predefine "fixed-width" time intervals, but instead determines time intervals based upon the distribution of sensor firings during the day. More particularly, the preferred machine learning module 22 estimates a probability density function, for sensor firings over time of day using smoothing techniques. In general terms, the resulting smoothed probability density function histogram reflects a curve of sensor activities over time, with the area under the curve from time $t_1$ to time $t_2$ equating to the probability that a sensor will fire between $t_1$ and $t_2$. An exemplary probability density function histogram for a sensor is provided in FIG. 2.

Figure 2:
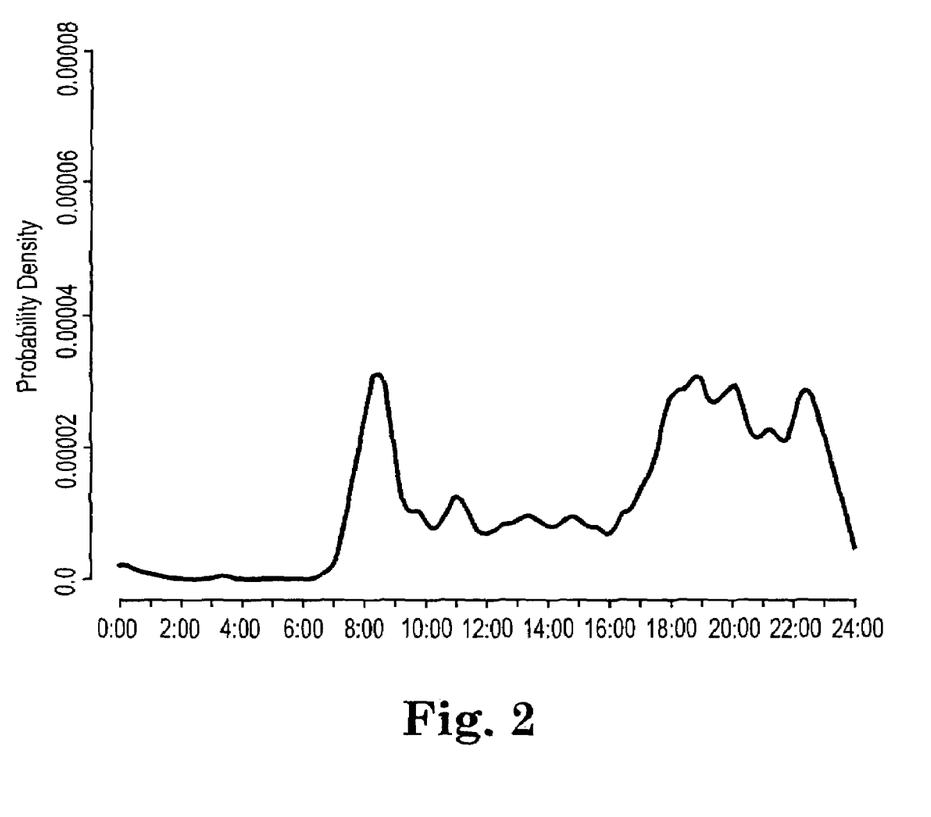
FIG. 2 is a graphical illustration of an exemplary probability density functions.

The preferred time interval determination defines time intervals as intervals between successive local minimas of the probability density function. An important concept underlying this approach is that an actor usually performs each daily activity during a certain time period. For example, the actor 36 may typically wake-up between 8:00 a.m. and 9:00 a.m. A sequence of sensor firings with attached or correlated timings (or "timestamps") of between 8:00 a.m. and 9:00 a.m. would thus represent a "waking-up" activity.

Figure 3:
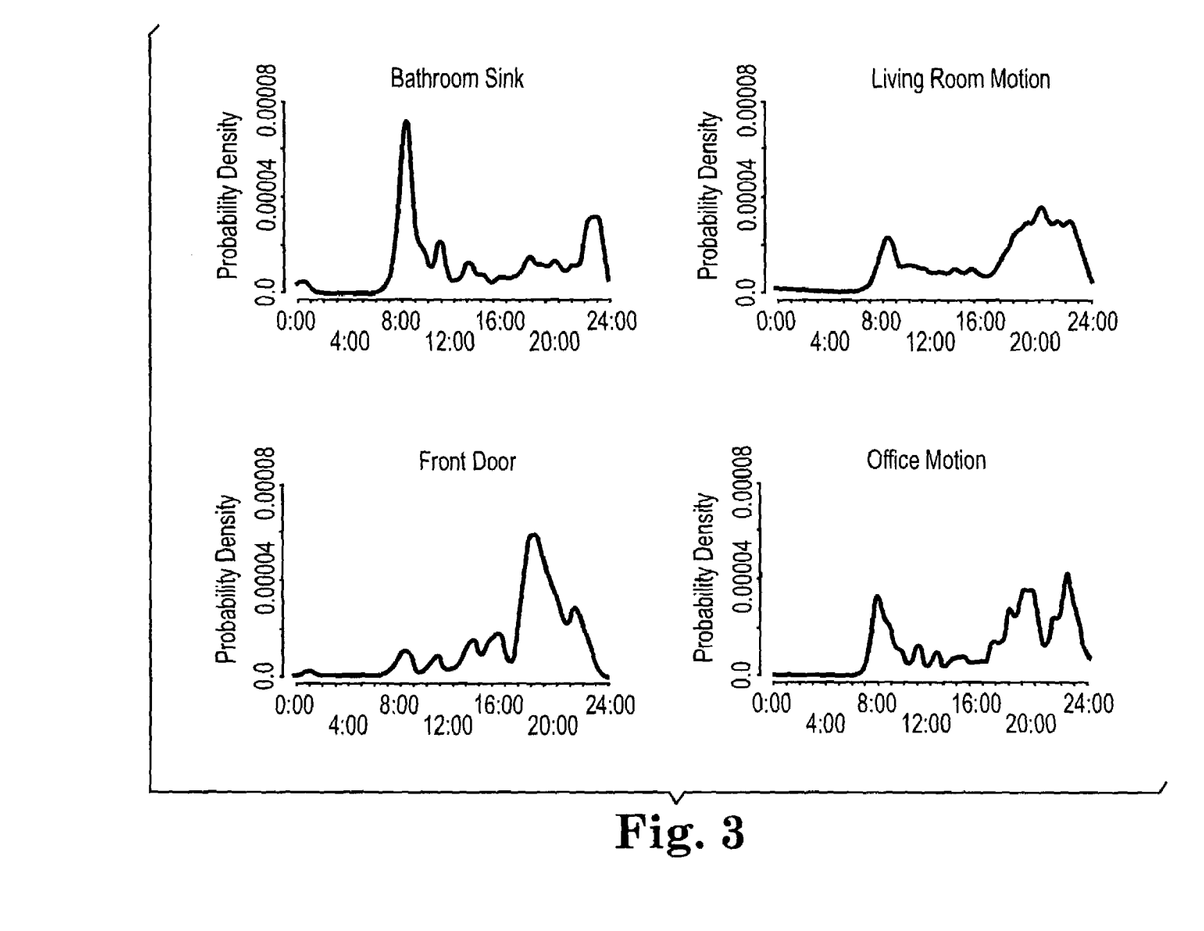
FIG. 3 is a graphical illustration of probability density functions of four sensors in an exemplary monitoring and response system installation.

Because some sensors will fire more frequently than others within a particular installation and will likely measure different kinds of activities, the preferred machine-learning module 22 determines time intervals by determining probability density functions for each sensor separately. For example, FIG. 3 depicts individual probability density function estimates for four separate sensors in a home (i.e., a bathroom sink sensor, a living room motion sensor, a front door sensor, and an office motion sensor). By estimating a probability density function for each individual sensor, the frequency of sensor activity can be accounted for when identifying event occurrence intervals. Relative to the example of FIG. 3, it can be seen that the bathroom sink is used much more heavily during the morning routine.

Returning to FIG. 1, based upon the above, the machine learning module 22 of the present invention preferably utilizes an algorithm to calculate time intervals of occurrence for various events. In a preferred embodiment, the algorithm accumulates firing data for all the sensors 26 in the actor's environment 38. In particular, the occurrence of a sensor firing is noted along with the time of day at which the sensor fired (hereinafter referred to as a "timestamp"). Thus, each sensor firing is recorded in conjunction with a corresponding timestamp. The firing/timestamp information is then sorted by sensor (i.e., all recorded firing/timestamp data for a particular sensor is commonly grouped). The probability density function for each sensor is then determined based upon the grouped data. This function is then utilized to generate appropriate "time intervals" for each sensor. In particular, the set of local minima (M) is determined for the density function and then converted to a sorted list relative to a 24-hour period (designated as "M'"). For each consecutive pair of end points in M', the "actual" or applicable time interval is determined based upon the "lowest" or "earliest" actual timestamp (designated as "x") within the consecutive pair of local minima end points and the "highest" or "latest" actual timestamp (designated as "w") within the local minima end point pair. Thus, the time partitions become the intervals between two successive local minimas. For example, a first consecutive pair of points in the sorted local minima M' for a sensor(s) is determined to be (00:00, 03:00). In reviewing the actual timestamps, it is found that six actual sensor firing timestamps were identified between 00:00 and 03:00. The smallest actual timestamp (x) is found to be 00:10 and the largest actual timestamp (w) is found to be 00:35. The resulting designated first interval is thus [00:10, 00:35]. This same process is repeated for remaining consecutive pair of end points in the sorted local minima M', resulting in a number of designated time intervals.

The above-described algorithm can be expressed as follows:

s=sensor of interest;
T=timestamps of all firings of s;
P=probability density function of T;
M=timestamps corresponding to local minima of P; and
M'=sorted list of [00:00, M, 24:00].

Then, for each consecutive pair within M' (∀ pairs ($m_i$, $m_{i+1}$)), $interval_i$ is designated as [x, w] where:

$x=t_j \epsilon T$ such that $m_i < t_j$ and $\beta t_k \epsilon T$ such that $m_i < t_k < t_j$ (note that the symbol "β" is "there does not exist");
$w=t_{j+1} \epsilon T$ such that $t_{j+1} < m_{i+1}$ and $\beta t_k \epsilon T$ such that $t_{j+1} < t_k < m_{i+1}$;
m=sensor timestamp;
j=index of timestamps from T; and
k=index of timestamps from T.

Notably, while the preferred technique partitions time over time-of-day, other partitioning criteria can be employed. For example, sensor information can be partitioned based upon number of firings per room or per day. Further, certain types of sensors provide information on a more continuous basis (e.g., blood pressure monitor); with these sensor types, the information is preferably partitioned over the measured values.

Regardless of how the time intervals are generated, the stored sensor firing/timestamp information is then reviewed and the appropriate time interval is associated with each entry. For example, a system installation may include four sensors A, B, C, and D. Over the course of several days, the machine learning database stores the sensor information, part of which is set forth below in Table 1:

TABLE 1

| Sensor | Firing Timestamp |
|--------|------------------|
| B | 21:21:33 |
| C | 21:22:44 |
| B | 21:22:47 |
| B | 21:24:54 |
| C | 21:25:18 |
| B | 21:40:36 |
| C | 21:40:41 |
| A | 21:40:51 |
| A | 21:40:24 |
| B | 21:45:44 |
| D | 21:46:14 |
| C | 21:48:13 |
| B | 21:48:15 |

As previously described, the sensor streams are separated (i.e., four separate lists are established, one each for sensors A-D). The probability density function for each list is then generated (i.e., again, four separate probability density functions would be provided). The time intervals are determined for each probability density function as previously described, such that there are a list of time intervals for each of the sensors A-D. With reference to the one specific example provided in Table 1 above, the time intervals are generated as being for sensor A, $interval_1$=[19:21:48, 23:58:09]; for sensor B, time $interval_1$=[18:00:00, 22:03:37]; for sensor C, $interval_1$=[13:23:15, 21:25:18], $interval_2$=[21:40:41, 23:58:09]; and for sensor D, $interval_1$=[21:26:14, 21:46:14]. The sensor firing/timestamp information is then reviewed, and a corresponding, appropriate time interval is "attached" or otherwise associated with each sensor firing/timestamp. With reference again to the above-examples set forth in Table 1, the attached time interval information results in the following time interval correlation as provided Table 2 below:

TABLE 2

| Sensor | Firing Timestamp | Assigned Time Interval |
|--------|------------------|------------------------|
| B | 21:21:33 | [18:00:00, 22:03:37] |
| C | 21:22:44 | [13:23:15, 21:25:18] |
| B | 21:22:47 | [18:00:00, 22:03:37] |
| B | 21:24:54 | [18:00:00, 22:03:37] |
| C | 21:25:18 | [13:23:15, 21:25:18] |
| B | 21:40:36 | [18:00:00, 22:03:37] |
| C | 21:40:41 | [21:40:41, 23:58:09] |
| A | 21:40:51 | [19:21:48, 23:58:09] |
| A | 21:44:24 | [19:21:48, 23:58:09] |
| B | 21:45:44 | [18:00:00, 22:03:37] |
| D | 21:46:14 | [21:26:14, 21:46:14] |
| C | 21:48:13 | [21:40:41, 23:58:09] |
| B | 21:48:15 | [18:00:00, 22:03:37] |

With the determined time intervals assigned to each sensor firing/timestamp, the machine learning module 22 is preferably adapted to perform sequential pattern discovery on the generated information to produce a learned model of behavior. In a preferred embodiment, the sequential discovery is executed based upon items and sequences. In this regard, each distinct sensor firing/timestamp (and assigned time interval or time partition pair) is defined as an "item". A "sequence" is an ordered list of items or sequential pattern. A sequence or pattern α can be denoted as $(\alpha_1 \to \alpha_2 \to \ldots \to \alpha_n)$ where each sequence element $\alpha_j$ is an item. An item can occur multiple times in a sequence.

After the time intervals are determined, the list of daily event sequences is translated into a data set suitable for learning sequential patterns. A sensor event maps to an item, and has a unique identifier. Without loss of generality, it can be assumed that no event sequence has more than one event with the same timestamp, and that the events are sorted by the time of occurrences.

The resulting input database stored by the machine learning module 22 consists of a number of these event sequences. The support of a pattern α is the fraction of sequences (or days) in the database that contain that pattern. According to this definition, the support of a pattern α is counted only once per sequence even though it may occur multiple times. Given a user-specified threshold called "minimum support", it can be determined that a pattern is "frequent" if its support is greater than the minimum support.

Once the list of sensor firings/timestamps is mapped to a database of sequences, the frequent sequential patterns can be computed efficiently using a variety of known sequential pattern discovery algorithms as set forth, for example, in R. Agrawal and R. Srikant, "Mining Sequential Patterns," *Proceedings of the Eleventh International Conference on Data Engineering (ICDE)*, pp. 3-14, 1995; M. V. Joshi, G. P. Karypis, and V. Kumar, "Universal Formulation of Sequential Patterns", *Technical Report, University of Minnesota, Department of Computer Science, Minneapolis, Minn.* 1999; R. Srikant and R. Agrawal, "Mining Sequential Patterns: Generalizations and Performance Improvements", *Proceedings of the Fifth International Conference on Extending Database Technology*, pp. 3-17, 1996; the teachings of which are incorporated herein by reference. Other analyses techniques are also available such as Tree Projection Sequential Pattern Algorithm as set forth in V. M. Guralnik, "Mining Interesting Patterns from Sequential Data", *Ph.D. Thesis, University of Minnesota, Minneapolis, Minn.*, 2001, the teachings of which are incorporated herein by reference.

In more general terms, and again with reference to the previous examples set forth in Tables 1 and 2 above, a sequence is identified as several "items" occurring in a row (i.e., is an ordered list of items). An ordered list of items as part of a sequence requires that the second item must occur after the first item. With reference to the information set forth in Table 2 above, one example sequence consists of: B 21:21:33 [18:00:00, 22:03:37] - - - C 21:25:18 [13:23:15, 21:25:18] - - - A 21:40:51 [19:21:48, 23:58:09]. In one preferred embodiment, identified "frequent" sequences can be refined for purposes of user presentation whereby the interval start and end times are ordered. With reference to the previously-provided exemplary sequence, the time interval refinement changes the identified sequence to be: B 21:21:33 [18:00:00, 21:25:18] - - - C 21:25:18 [18:00:00, 21:25:18] - - - A 21:40:51 [19:21:48, 23:58:09]. Notably, this refinement step does not affect the accuracy of the algorithm, and is performed strictly to enhance presentation/review of the information to/for human reviewers. Relative to an automated monitoring and response system, however, the refinement described above is unnecessary.

Regardless of the exact technique or algorithm(s) utilized to analyze the sensor data, it is recognized that an enormous number of highly frequent, but not necessarily useful, sequential patterns will be generated. In fact, in data sets with characteristics likely encountered with the monitoring and response system 20, the number of patterns generated by the pattern analysis portion of the machine learning module 22 can be the same magnitude as the number of sensor firings in the data set. A list of several thousand patterns is only marginally more useful than the raw data itself. Thus, in a preferred embodiment, the machine learning module 22 is adapted to find "interesting" sequences that will help to create a model of the actor's 36 behavior or activities during the day.

With the above in mind, the machine learning module 22 preferably further includes filter routines for reducing the number of identified patterns into more meaningful or interesting information. A first preferred filter routine entails a domain heuristic that eliminates patterns that are not close in time, and is thus based on the assumption that the closeness in time of occurrence of events provides evidence in support of those firings being related to one activity. The closer the events occur in time, the more likely that the events belong to the same activity. To this end, it is noted that domain knowledge is fairly fuzzy, such that is difficult to define specific parameter values for "closeness in time".

In one preferred embodiment, the domain heuristic filter routine provides that a pattern represents two different activities if it contains events that have non-intersecting time intervals. By way of example, the pattern analysis may identify the following patterns:

1.) bedroom motion [06:00, 07:00], then bathroom motion [06:00, 07:00];
2.) kitchen motion [12:00, 13:00], then dining room motion [12:30, 13:30], then kitchen motion [13:00, 14:00];
3.) bedroom motion [06:00, 07:00], then kitchen motion [12:00, 13:00], then dining room motion [12:30, 13:30].

While the first two patterns represent one activity each (waking up and having lunch, respectively), the third represents a combination of the parts of those two activities. Application of the domain heuristic filter routine generally limits the learned patterns to ones that represent one activity. It should be noted that any patterns "discarded" by this filter can be analyzed by a different technique; for example, to calculate that "lunch" occurs a certain timelag after "breakfast".

A second preferred filter routine eliminates redundant patterns by removing all sub-patterns that have the same supporting days. The closed set reduces the set of all frequent patterns by several orders of magnitude, while not losing any information. For example, if a pattern A→B→C→D is identified as occurring on days 1, 7, 14, 21, as well as patterns A→B→C and B→C→D as also occurring on days 1, 7, 14, and 21, the two sub-patterns can be eliminated. Notably, and with respect to this same example, if the pattern A→B→C occurs on days 1, 2, 7, 8, 14, 21, 24, it is preferably not deemed redundant by the redundant filter routine, and thus would not be eliminated.

A third filter routine preferably provided by the machine learning module 22 is a domain heuristic that eliminates repetitive sensor firing information. In general terms, this repetitive sensor filter routine exploits the domain knowledge that some sensors will continually fire even though the same event triggered them. For example, if the actor 36 props open the front door during the summer, an associated door-contact switch/sensor will continually fire at regular intervals. To condense stored data, these multiple sequential firings of the same sensor are reduced to a single firing.

The machine learning module 22 can further incorporate additional filtering-type operations to facilitate a better understanding of identified patterns. For example, a clustering technique can be performed on the identified patterns, with each cluster representing different variations of the same activity. For example, M. Steinbach, G. Karypis, and V. Kumar, "A Comparison of Document Clustering Techniques", *K.D.D. Workshop on Text Mining,* 2000 provides a vector-spaced k-means algorithm, the teachings of which are incorporated herein by reference. To apply this algorithm with the machine learning module 22, the patterns are mapped to a vector space with the dimensions being distinct event types of all the patterns. A pattern is represented as an n-dimensional vector of zeros and ones, with ones corresponding to all of the events present in that particular pattern. This clustering can be done apart from the pattern learning, and can be based upon numerous other parameters, such as proximity (e.g., location of sensor(s) to one another, time, etc.).

The present invention provides a marked improvement over previous designs. In particular, by providing an automated actor monitoring and response system incorporating at least one machine learning module, the resulting system is readily able to adapt to its environment over time. In one preferred embodiment, a sequential pattern learning approach is implemented within the learning module to generate learned models of behavior.

Although the present invention has been described with reference to preferred embodiments, workers skilled in the art will recognize that changes can be made in form and detail without departing from the spirit and scope of the present invention.

What is claimed is:

1. A method of operating an automated monitoring system adapted to monitor an actor in an environment, the method comprising:
   providing at least one sensor for monitoring at least one of said actor and said environment;
   accumulating information signaled by said at least one sensor over time, said information being indicative of functioning of at least one of said actor, said environment, and said system;
   determining a probability density function for said information signaled by each sensor of said at least one sensor in order to create data indicative of said each sensor activity;
   utilizing a plurality of filter routines to reduce a quantity of said data indicative of said each sensor activity wherein said plurality of filter routines includes a plurality of the following: a domain heuristic filter routine, a redundant pattern filter routine, a repetitive sensor firing routine and a cluster technique filter routine;
   automatically generating a learned model of behavior based upon said data indicative of said each sensor activity reduced by said plurality of filter routines;
   operating said system to generate a response for assisting said actor based upon reference to said learned model of behavior; and
   automatically acting upon said response to assist said actor, characterized by altering a current mode of operation of a user interface device located in said environment in a manner differing from previously assigned instructions.

2. The method of claim 1, wherein said environment is a daily living environment.

3. The method of claim 1, wherein said functioning of at least one of said actor, said environment, and said system is selected from the group comprising: an activity, a preference, a status description, and performance.

4. The method of claim 1, wherein said learned model of behavior provides at least one property selected from the group consisting: time of day, day of week, day of month, day of year, month, year, duration, frequency, likelihood of activity occurring, likelihood of activity not occurring, likelihood of commencing activity, likelihood of abandoning activity, possible outcomes, and effectiveness of outcomes.

5. The method of claim 1, wherein said learned model of behavior provides at least one property selected from the group comprising: frequency of correlation between functionings, dependence of the functionings, duration between start time of the functionings, duration between end times of the functionings, duration between specific points of the functionings, and effect of a first functioning on a second functioning.

6. The method of claim 1, further comprising:
   generating a plurality of learned models of behavior each relating to a different subject matter.

7. The method of claim 1, further comprising:
   providing said learned model of behavior to a second monitoring system that monitors a second human actor in a second environment; and
   operating said second monitoring system utilizing said learned model of behavior as a baseline.

8. The method of claim 1, further comprising:
   creating a meta-model of behavior by merging at least two learned models of behavior; and
   operating a second monitoring system that monitors a second human actor in a second environment utilizing said meta-model of behavior as a baseline.

9. The method of claim 1, further comprising:
   storing feedback information relating to at least one of said actor and said environment;
   wherein generating said learned model of behavior is based upon said stored feedback information.

10. The method of claim 9, wherein said feedback information relates to a preference of said actor.

11. The method of claim 9, wherein said feedback information relates to performance of said system.

12. The method of claim 1, further comprising:
    posing questions; and
    recording responses to said questions;
    wherein said learned model of behavior is based upon said responses.

13. The method of claim 12, wherein said questions relate to a status of at least one of said actor and said environment.

14. The method of claim 12, wherein said questions relate to an activity of at least one of said actor and said environment.

15. The method of claim 1, wherein said learned model of behavior is indicative of an expected activity, the method further comprising:
    determining a current activity of at least one of said actor and said environment; and
    comparing said current activity with said expected activity.

16. The method of claim 1, further comprising:
    adapting operation of said system based upon said learned model of behavior.

17. The method of claim 1, wherein automatically generating a learned model of behavior further includes:
    condensing multiple, sequential firings of said at least one sensor into a single data item.

18. The method of claim 1, wherein said at least one sensor comprises a plurality of sensors, the method further comprising:
    condensing firings of two or more of said plurality of sensors into a single data item.

19. The method of claim 1, further comprising:
    automatically assessing a current situation of at least one of said actor and said environment based in part upon said learned model of behavior.

20. The method of claim 19, wherein said system includes an intent recognition module adapted to determine an intended activity of said actor based upon a series of sensed actions, and further wherein assessing a said current situation includes:

provide said learned model of behavior to said intent recognition module; and operating said intent recognition module to designate said intended activity of said actor based upon said series of sensed actions and said learned model of behavior.

21. The method of claim 19, wherein said learned model of behavior is indicative of steps normally performed by said actor in completing a particular task, and further wherein assessing a said current situation includes:

determining whether said actor is engaged in said particular task;

comparing steps actually performed by said actor as part of said particular task with said learned model of behavior; and determining whether said actor has abandoned said particular task based upon said comparison.

22. The method of claim 1, wherein said learned model of behavior is indicative of a probability of said actor selecting a particular action of a plurality of action options.

23. The method of claim 1, wherein said learned model of behavior is indicative of an expected activity, and further wherein operating said system includes generating a response when a current activity varies from said expected activity, and delivering said response to said actor.

24. The method of claim 1, wherein operating said system to generate a response includes:

adapting a generated response based upon reference to said learned model of behavior.

25. The method of claim 24, wherein said learned model of behavior is indicative of an effectiveness of previously generated responses, and further wherein adapting a generated response includes:

formatting a response based upon said effectiveness of previously generated responses.

26. The method of claim 25, wherein said response includes a message component for providing a message to at least one of said actor and other humans, and further wherein said learned model of behavior is indicative of an effectiveness of previous messages, and further wherein formatting said response includes:

formulating said message component based upon said effectiveness of previous messages.

27. The method of claim 1, wherein said learned model of behavior is indicative of said actor selecting a particular action of a plurality of action options, and further wherein operating said system to generate said response includes:

generating said response based upon a probability of action selection.

28. The method of claim 1, wherein said learned model of behavior is indicative of a likelihood of said actor successfully completing an activity, and further wherein operating said system to generate response includes:

generating said response based upon the likelihood of said actor successfully completing the activity.

29. The method of claim 1, wherein said learned model of behavior is indicative of an expected path the actor normally follows in said environment, and further wherein operating said system includes:

generating said response based upon said expected path.

30. The method of claim 29, wherein said response includes actuating at least one component of said environment along said expected path.

31. The method of claim 1, wherein automatically generating said learned model of behavior includes:

organizing said probability density function determined therein into sequential patterns.

32. The method of claim 31, wherein a plurality of sensors are provided, and further wherein organizing said probability density function therein includes:

designating discrete partitions for each probability density function for each sensor of said plurality of sensors; and categorizing said each probability density function for each sensor of said plurality of sensors in accordance with said designated partitions;

wherein said sequential patterns are formulated based upon said categorized probability density functions.

33. The method of claim 32, wherein said discrete partitions are time interval values, and further wherein designating said time interval values includes:

determining at least one time interval value for each said each probability density function for each sensor of said plurality of sensors.

34. The method of claim 31, wherein automatically generating said learned model of behavior further includes:

eliminating redundant sequential patterns from the learned model of behavior.

35. The method of claim 34, wherein eliminating said redundant sequential patterns further includes:

identifying sequential sub-patterns; and removing all said sequential sub-patterns that have identical days of occurrence as a corresponding sequential pattern.

36. A system for automatically monitoring and supporting an actor in an environment, the system comprising:

at least one sensor;

at least one effector; and a controller for receiving information from said at least one sensor to monitor said actor and for controlling operations of said effector based upon the said information, said controller further being adapted to:

accumulate information signaled by said at least one sensor over time;

determine a probability density function for said information signaled by each sensor of said at least one sensor in order to create data indicative of said each sensor activity;

utilize a plurality of filter routines to reduce a quantity of said data indicative of said each sensor activety wherein said plurality of filter routines includes a plurality of the following: a domain heuristic filter routine, a redundant pattern filter routine, a repetitive sensor firing routine and a cluster technique filter routine;

automatically generate a learned model of behavior relating to one of said actor and said environment based upon said data indicative of said each sensor activity reduced by said plurality of filter routines;

automatically initiate providing of assistance to said actor based upon reference to said learned model of behavior by automatically altering a current mode of operation of said effector in a manner indicated by said learned model of behavior.

37. The system of claim 36, wherein the environment is a daily living environment.

38. The system of claim 36, wherein said learned model of behavior relates to a status of at least one of said actor and said environment.

39. The system of claim 36, wherein said learned model of behavior relates to an activity of at least one of said actor and said environment.

40. The system of claim 36, wherein said learned model of behavior relates to a preference of at least one of said actor and an other person in said environment.

41. The system of claim 36, wherein said learned model of behavior relates to performance of the system.

42. The system of claim 36, wherein said controller is further adapted to:
generate a plurality of learned models of behavior wherein each learned model of behavior relates to a different subject matter.

43. The system of claim 36, wherein said controller is further adapted to:
receive a second learned model of behavior from a second monitoring and response system; and
operate the system utilizing said second learned model of behavior as a baseline.

44. The system of claim 36, wherein the learned model of behavior is indicative of an expected activity of one of said actor and said environment, and further wherein said controller is adapted to:
determine a current activity of one of said actor and said environment; and
compare said current activity with said expected activity.

45. The system of claim 36, wherein said controller is further adapted to:
adapt operation of said system based upon the learned model of behavior.

46. The system of claim 36, wherein said controller is further adapted to:
assess a current situation of at least one of said actor and said environment based, in part, upon the learned model of behavior.

47. The system of claim 36, wherein said learned model of behavior is indicative of a likelihood of said actor successfully completing a particular activity, and further wherein said controller is adapted to:
recognize whether said actor is engaged in said particular activity; and
generate a response relating to said engaged particular activity based upon said learned model of behavior.

48. The system of claim 36, wherein said learned model of behavior is indicative of effectiveness of previously generated responses, and further wherein said controller is adapted to:
generate a current response based upon said effectiveness of previously generated responses.

49. The system of claim 36, wherein said controller is further adapted to:
organize said information signaled by said at least one sensor into sequential data patterns.

50. The system of claim 49, wherein said system includes a plurality of sensors, and wherein said controller is further adapted to:
designate discrete partitions for each probability density function for each sensor of said plurality of sensors; and
categorize said each probability density function for each sensor of said plurality of sensors in accordance with the designated partitions;
wherein said sequential patterns are formulated based upon said categorized probability density functions.

51. The system of claim 50, wherein said discrete partitions are time interval values and wherein said controller is further adapted to:
determine at least one time interval value for said each probability density function for each sensor.

52. The system of claim 49, wherein said controller is further adapted to:
eliminate redundant sequential patterns from said learned model of behavior.

53. The system of claim 52, wherein said controller is further adapted to:
identify sequential sub-patterns; and
remove all sequential sub-patterns from said learned model of behavior that have identical days of occurrence as a corresponding sequential pattern.

54. A method of building a learned model of behavior for use by an actor monitoring and support system, the method comprising:
receiving a plurality of data items for at least two weeks from a plurality of information sources wherein each information source of said plurality of information sources relates to at least one of said actor or an environment of said actor;
assigning a time of day of occurrence to each data items of said plurality of data items from at least one source of said plurality of information sources;
separately aggregating said plurality of data items from said each information source;
determining a probability density function for said plurality of data items from said each information source in order to create data indicative of said each information source;
utilizing a plurality of filter routines to reduce a quantity of said data indicative of said each information source wherein said plurality of filter routines includes a plurality or the following: a domain heuristic filter routine, a redundant pattern filter routine, a repetitive sensor firing routine and a cluster technique filter routine;
determining discrete partitions for said each information source of said plurality of information sources based upon an evaluation of said data items and said time of day of occurrence;
assigning a corresponding partition value to said each data item;
automatically generating a learned model of behavior based upon said corresponding partition value; and
utilizing said learned model of behavior thereby created to generate responses by actuators in said environment.

55. The method of claim 54, further comprising:
organizing said data items into sequential patterns based upon said assigned partition values.

56. A method of operating an automated monitoring system adapted to monitor an actor in an environment, the method comprising:
providing a plurality of sensors for monitoring a human actor in a daily living environment including a sensor adapted to pose, and record responses to, questions presented to the actor;
accumulating information signaled by said plurality of sensors over time indicative of said human actor functioning in said daily living environment; and
creating a plurality of probability density functions by determining a probability density function for each sensor of said plurality of sensors in order to create data indicative of said each sensor activity;
utilizing a plurality of filter routines to reduce a quantity of said data indicative of said each sensor activity wherein said plurality of filter routines includes a plurality of the following: a domain heuristic filter routine, a redundant pattern filter routine, a repetitive sensor firing routine and a cluster technique filter routine;
generating a learned model of behavior based upon said data indicative of said each sensor activity reduced by said plurality of filter routines; and
utilizing said learned model of behavior to generate responses by actuators in said environment.

* * * * *